Sept. 8, 1953 L. HORNBOSTEL 2,651,103
ANTIDEFLECTION ROLL ASSEMBLY
Filed April 9, 1948 3 Sheets-Sheet 2
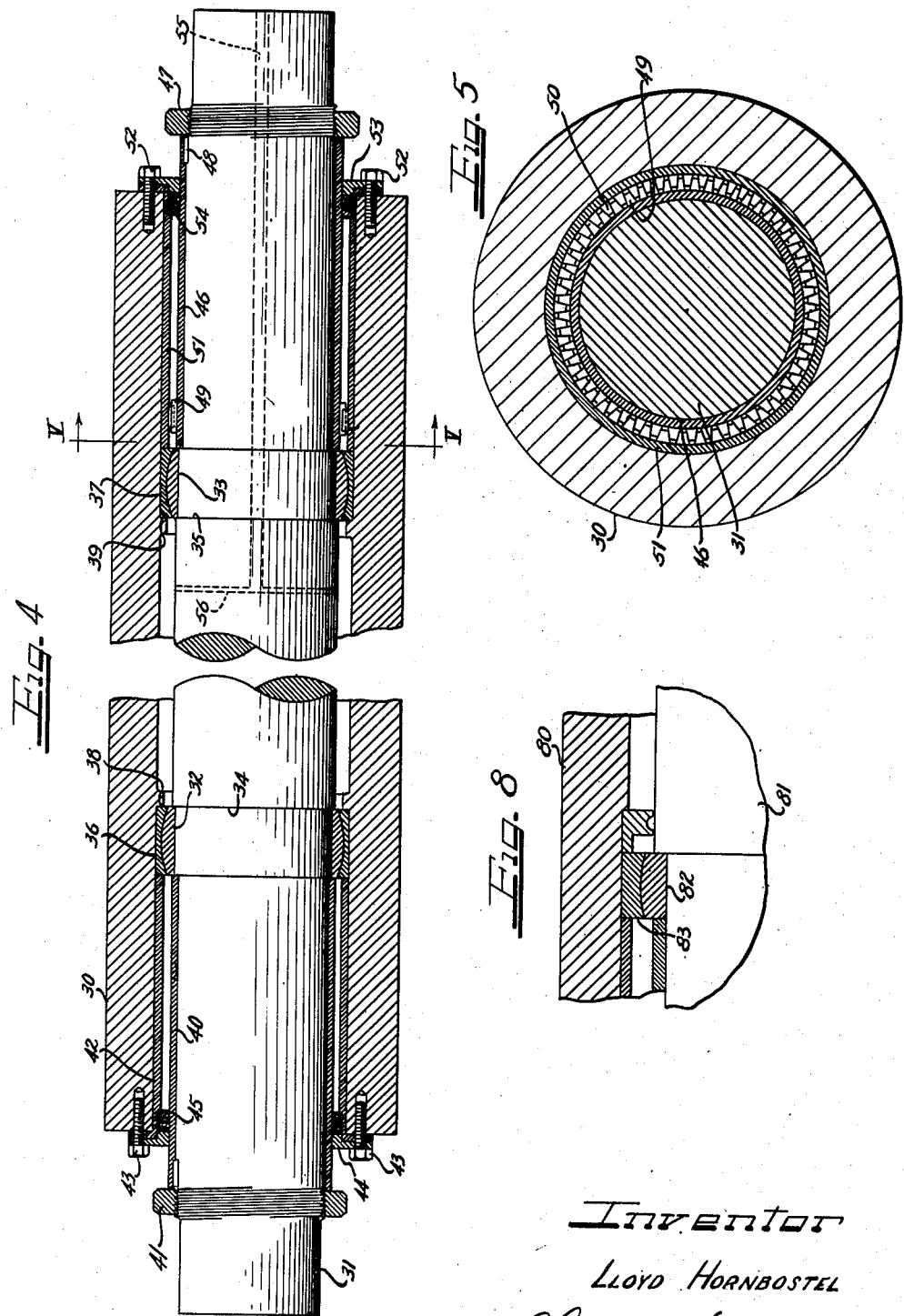
Inventor
LLOYD HORNBOSTEL
by The Firm of Charles W. Hill Attys.

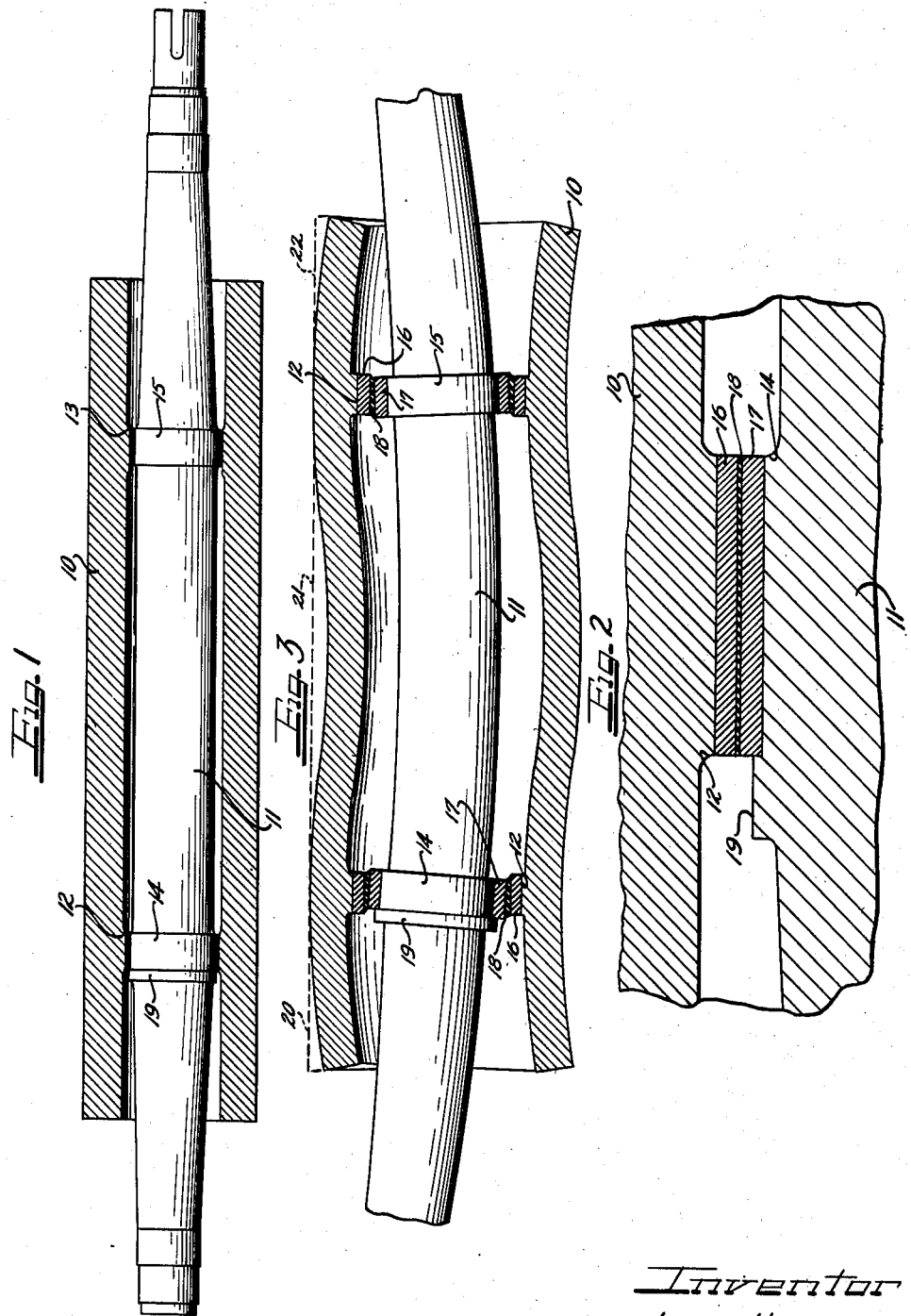

Sept. 8, 1953

L. HORNBOSTEL 2,651,103

ANTIDEFLECTION ROLL ASSEMBLY

Filed April 9, 1948

Inventor
LLOYD HORNBOSTEL
by The Firm of Charlesow Hill Attys.

Patented Sept. 8, 1953

2,651,103

UNITED STATES PATENT OFFICE 2,651,103

ANTIDEFLECTION ROLL ASSEMBLY

Lloyd Hornbostel, Beloit, Wis., assignor to Beloit Iron Works, Beloit, Wis., a corporation of Wisconsin Application April 9, 1948, Serial No. 20,010

12 Claims. (Cl. 29—123)

This invention relates to improvements in the construction of rolls and supports therefor, and more particularly to improvements in rolls used in paper making which are subject to enough pressure to cause sufficient deflection to make crowning of such rolls advisable.

In a stack of calender rolls, for example, the bottom roll is subjected to a large amount of pressure and, having no roll thereunder, it has a tendency to deflect in accordance with the degree of pressure and the particular construction of the roll. It has been customary for some time to offset the expected deflection by grinding the bottom calender roll to provide a small amount of crown therein so that when the deflection does occur it will be offset by the crowning. However, such a crown is most effective only for the single calculated pressure for which it was designed and only at such pressure does it afford a uniform pressure at the nip with the overlying roll.

As a general rule, bottom calender rolls have heretofore been supported on journals which were part of the rolls and supported on bearings outside of the face of the rolls.

The present invention provides a roll and axle assembly therefor in which a through axle is provided with annular bearing surfaces or pads, or other bearing means well inside of the roll, while corresponding bearing surfaces or pads or other bearing means on the inner surface of the roll cooperate with these axle bearing surfaces so that the roll is thereby supported, not at its ends but intermediate thereof. I have further discovered that by providing these intermediate supports at a certain distance from the ends of the roll no crowning of the roll between these points of support is required as the end portions of the roll outside of the points of support effect a cantilever action which counteracts the deflection of the middle portion of the roll. I find that by locating these two points of support inwardly from the roll ends approximately one fifth of the total roll length the best results are obtained. When a true cylindrical roll is thus supported and pressure is applied uniformly from end to end of the roll, the deflection at the roll ends will be equal to the deflection at the point of the roll which is midway between the supports.

However, when a calender roll is thus internally supported there will result some relative movement and some wear between the pads of the roll and axle, which will develop into looseness of fit. I find that this condition can be corrected by interposing rubber or some other flexible element between the pads, or by otherwise supporting the roll on the axle in such a manner that relative movement between them may occur without damage to either.

Accordingly the general object of the invention is to support a press roll upon an axle at two positions inwardly from the opposite ends of the roll each about one fifth the length of the roll.

Another object of the invention is to provide at such support positions flexible contact surfaces to prevent damage to the metal of the axle and roll at such positions.

Another object is to provide at the aforesaid support positions insertable sleeves and collars with a rubber liner between them.

Another object of the invention is to support the roll on the axle by means allowing relative longitudinal movement of the roll and axle but preventing relative rotative movement.

Another object of the invention is to provide at the aforesaid support positions insertable sleeves and collars for positioning cooperative bearing elements serving to support the roll on the axle and to allow relative movement of the roll and axle.

Other objects and advantages of the invention will be mentioned hereinafter or will be apparent from a perusal of this specification.

In the drawings:

Figure 1 is a longitudinal sectional view of one form of a roll and axle made in accordance with this invention.

Figure 2 is a sectional view on an enlarged scale of the inner support assembly at the left end portion of the roll and axle shown in Figure 1.

Figure 3 is a diagrammatic illustration, greatly exaggerated, of the deflection effects in a bottom calender roll when loaded.

Figure 4 is a longitudinal sectional view of a first modified form of roll and axle made in accordance with this invention.

Figure 5 is a vertical sectional view on the line V—V of Figure 4.

Figure 8 is a fragmentary section of a fourth modification of the invention.

Figure 6:
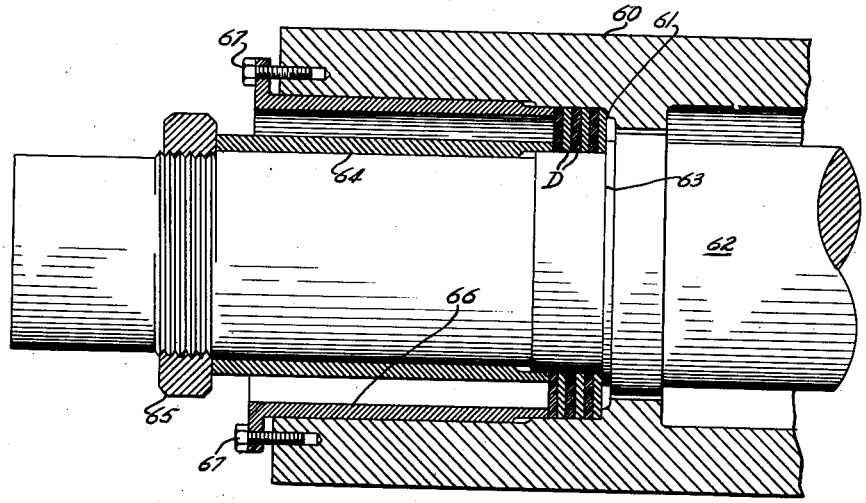
Figure 6 is a longitudinal sectional view of one end portion of a second modified form of roll and axle made in accordance with this invention.

Referring to Figure 1 of the drawing, a roll 10 is shown mounted on an axle 11 intended to rotate therewith. At 12 and 13 I provide the roll with annular pads or thickened portions aligned with annular pads 14 and 15 on the axle.

Figure 2 shows a sleeve 16 and a collar 17 with a thin layer 18 of rubber between them. Preferably, the rubber is vulcanized or otherwise bonded to both the sleeve and the collar, thus making into a unit the sleeve, collar and layer. The sleeve 16 should have a very tight press fit within the roll shoulder 12 while the collar 17 should have a tight press fit on the enlarged portion 14 of the axle. The rubber layer may be quite thin, such as one-sixteenth of an inch, for example, although this layer may be varied somewhat in thickness.

The sleeve, collar and rubber layer at the other support position should be identical in design.

When assembling the axle and roll, the unit consisting of the collar 17, rubber layer 18 and sleeve 16 will be mounted on the axle adjoining the limit or guide shoulder 19, and the axle pressed in the roll. Thereafter, a collar, sleeve and rubber layer assembly for the other internal support of the roll may be slipped over the opposite end of the axle and forced into position by the tools suitable for that operation.

Apart from the deflection of the roll itself, the axle itself will also deflect under heavy pressures, and when a roll is supported internally as shown, a certain amount of relative movement will occur between the roll and the axle which in time, due to the operating pressures and friction between roll and axle, would cause, in the absence of the sleeve, collar and rubber layer assembly, a deterioration in the metal to metal contacting surfaces. This effect may be termed "galling" or "Brinelling," and is a form of metal fatigue and wear which is harmful to both axle and roll.

However, by employing the support assembly herein shown, the rubber layer eliminates the metal to metal friction, even though the layer be as thin as described, and the "galling" is thus avoided.

Hence, the improvement in roll deflection characteristics, first mentioned, may be obtained to the fullest advantage without any diminution in the durability of the roll and axle.

Figure 3 exaggerates the actual deflection and the relative movement of the integral annular pads of the roll and axles, but thus serves to indicate that the gap or space occupied by the rubber layer is continually changing in shape and position. However, the rubber layer, due to the interparticle flow capacity of rubber molecules, will accommodate itself to these changes by flowing under stress from high load to low load areas while always attempting to reclaim a uniformly loaded position. The rubber is solid and therefore not compressible, but it will work and flow with the changing gap and at all points it will remain interposed between the opposing metal surfaces of the sleeves and collars, very effectively preventing the "galling" heretofore mentioned. Consequently looseness of the roll on the axle does not develop.

Figure 3 also exaggerates the deflection of a true cylindrical roll supported as shown. The total deflection of the middle portion of this roll will be less than if the roll were supported only at its ends. Hence, less crowning in the middle is required to obtain uniform pressure at the nip with the overlying roll. The end portions of the roll are ground to provide an expanding taper toward the ends. The crown and taper are diagrammatically suggested by the dash lines 20, 21 and 22.

The maximum thickness of the crown or tapers required in a roll supported in accordance with this invention are less than would be the thickness of a single crown provided on a roll supported only at its ends, hence reasonable variations in the load on this roll will not greatly affect the uniformity of pressure at the nip from one end of the roll to the other end.

It may further be noted that when a roll is supported internally on a separate axle with metal to metal contacting surfaces, the roll and the axle have unequal deflection characteristics. Yet if one attempts to hold them together by tight friction fit of the metal surfaces, these unequal deflection tendencies will modify or react on each other in an unpredictable and non-uniform manner varying with the slippage between their mutually contacting surfaces. This will result in wobbling which will accentuate the incompatible deflection characteristics of the roll and axle.

However, the rubber layer provided in accordance with this invention permits, in fact encourages, relative axial slippage between the roll and axle, and enables each of the two structures to deflect freely in accordance with its own natural tendency, and there results a marked improvement in the smooth rotation of the roll.

While axial shifting or slippage is permitted it is nevertheless limited—in fact, self-limiting and as the forces tending to produce relative angular rotation are slight such movement will be indeed even more limited.

In the form of the invention shown in Figures 4 and 5 a roll 30 is shown mounted upon an axle 31, intended to rotate therewith. The positions where the roll is supported on the axle are, as is true of the form shown in Figure 1, located inwardly from the ends of the roll one-fifth of the length of the roll, in order to obtain the deflection characteristics which have heretofore been explained.

In this form of the invention, convex-surfaced collars 32 and 33 are mounted on the shaft 31 against shoulders 34 and 35, and sleeves 36 and 37 correspondingly concaved are positioned in the roll, as shown. The collars will have a tight fit upon the axle shaft while the sleeves 36 and 37 will fit tightly against the interior surface of the roll and will be located against the shoulders 38 and 39.

A sleeve 40 at one end of the roll, held in place by nut 41, will hold the collar 32 at its proper location. Another sleeve 42, held in place by bolts 43 will hold the bearing sleeve 36 in place. The collar 44 retains packing 45 as shown. At the other end of the roll, a sleeve 46 serves to hold the bearing collar 33 in location and itself is held non-rotatably upon the shaft 31 by means of a nut 47 and a key 48. This sleeve is further provided with an external ring gear 49 which may be formed integrally therewith or otherwise fixed upon its outer periphery. The teeth of ring gear 49 mesh with the gear teeth 50 which are formed integrally upon or otherwise fixed securely upon the interior surface of the sleeve 51 which holds the bearing sleeve 37 in place. The latter sleeve 51 is bolted to the end of the roll by means of bolts 52 in conjunction with a collar 53 which latter holds packing material 54 between the sleeves 46 and 51. Similar packing material at both ends of the shaft enable one to keep a body of oil inside of the roll so that the bearing surfaces between the convex collars 32 and 33 and the concave sleeves 36 and 37 may be lubricated.

Ducts 55 and 56 may be provided for supplying oil to the interior of the roll.

As may be appreciated from the discussion of the deflection problems in connection with the embodiment shown in Figures 1, 2 and 3, the roll and axle assembly shown in Figures 4 and 5, when subjected to similar loads, will likewise be deflected. However, as the internal supports are positioned inwardly from the roll ends about one-fifth of the length of the roll the pressure on the roll ends outside of the support will effect a cantilever action which will lessen the distortion of the central portions of the roll. Consequently less crowning of the central portion of the roll will be required than if the supports were outside of and beyond the roll ends. Also, as there will be some deflection of the roll end portions, they may be provided with a small amount of expanding taper so that the total effect will be to provide uniform pressure at the nip with the overlying roll.

It will further be appreciated that when a roll and axle are constructed as shown in Figures 4 and 5 and deflection of both the roll and axle does occur, relative movement of these two parts may develop along the curved surfaces at the support positions, but as these surfaces are lubricated, and the relative movement is of course slight, no appreciable wear should take place.

Another modification of the invention is shown in Figure 6. In this form of the invention I provide near each end of the roll 60 a shoulder 61 and near each end of the rotatable shaft 62 a shoulder 63. Against these shoulders I align a group of flexible discs D which may be made of metal, fibrous material or molded synthetic materials of sufficient strength and flexibility for the purpose. These discs D bridge the gap between the roll and axle and can flex laterally between their inner and outer margins in response to the dissimilar deflection of the axle and the roll. The inner and outer margins of the discs are clamped in position by means of tight press fits from the sleeve 64 held by the nut 65 and from the sleeve 66 secured to the roll by means of bolts 67.

The support positions at which this group of discs will be located near each end of the roll will preferably be disposed within each roll a distance from the end of each roll equal to one-fifth of the total length of the roll. Thus the cantilever action between the roll end portion and the middle portion of each roll as discussed heretofore will be obtained.

Figure 7:
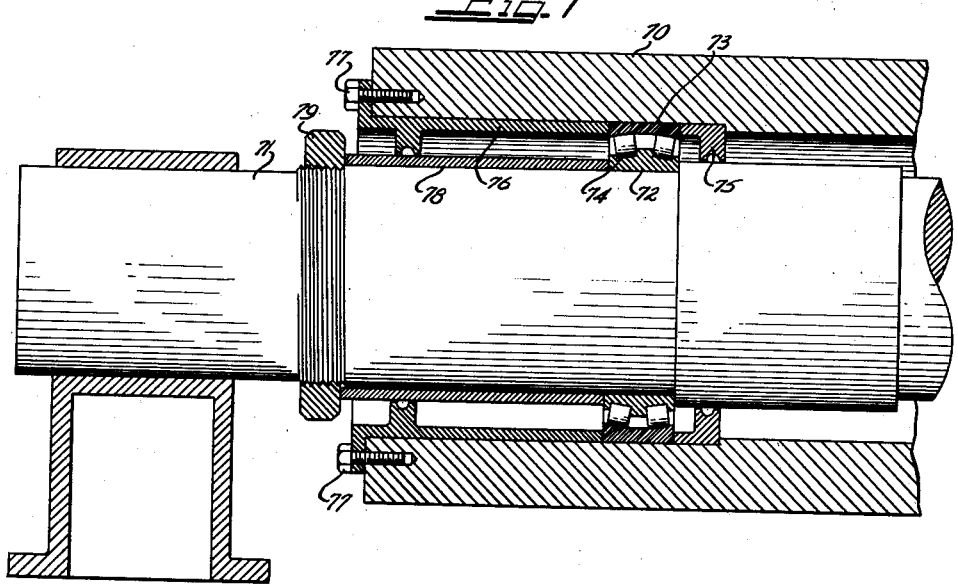
Figure 7 is a longitudinal sectional view of one end portion of a third modified form of roll and axle made in accordance with this invention.

Another modification of the invention is shown in Figure 7. This form of the invention may be utilized when the roll 70 is supported upon a stationary or dead shaft 71. In this case I mount a roller bearing assembly upon the shaft, including the inner race 72, the outer race 73 which should have a press fit on the interior of the roll, together with the roller bearing elements 74. This roller bearing may be lodged against a shoulder provided on the interior of the roll by means of an annular flange member 75 which is non-rotatably secured in the roll with a press fit and which has an edge portion contacting the surface of the shaft serving as an oil seal. A similar oil seal may be provided on the sleeve 76 which is secured by bolts 77 to the roll end and which holds the roller bearing race 73 in place. A sleeve 78 on the shaft 71 holds the roller bearing race 72 in place, and itself is held in position by the nut 79.

A modification similar to the form of the invention shown in Figure 7 is shown in Figure 8. In this instance the roll 80 is mounted on a dead shaft 81, and in place of a roller bearing at the support position, inwardly from the roll ends one-fifth of its length I provide a convex collar 82 non-rotatably mounted on the shaft and a concave sleeve 83 non-rotatably fixed within the roll interior. The sleeve rotates upon the stationary collar 82, thus supporting the roll upon the shaft. Any appropriate means for lubricating this bearing surface may be provided.

It will, of course, be understood that the details of construction herein disclosed are subject to some variations without departing from the principles of this invention and it is, therefore, not the purpose to limit the patent granted hereon otherwise than necessitated by the scope of the appended claims.

Having shown and described my invention, I claim:

1. A roll and axle assembly adapted for paper making machinery comprising a roll, a pair of annular bearing means disposed internally of the roll each spaced inwardly from the roll ends, a through axle extending through and beyond the roll ends, annular bearing means on the axle registering with the roll bearing means and supporting the roll wholly thereon and a thin layer of flexible rubber-like material interposed between each of the cooperating roll and axle bearing means.

2. A roll and axle assembly adapted for paper making machinery comprising a roll having a pair of internal inwardly projecting annular surfaces thereon each spaced inwardly from the roll ends, a removable sleeve tightly embraced by each of said annular surfaces, a through axle extending through and beyond the roll ends, a pair of annular enlarged portions on said axle spaced to register with said surfaces, a removable collar tightly surrounding each said enlarged portion, and a layer of rubber between each sleeve and associated collar.

3. A roll and axle assembly adapted for paper making machinery comprising a roll having internal inwardly projecting annular surfaces thereon spaced inwardly from the roll ends, a removable sleeve tightly embraced by each of said annular surfaces, a through axle extending through and beyond the roll ends, annular enlarged portions on said axle spaced to register with said surfaces, a removable collar tightly surrounding each said enlarged portion, and a layer of rubber between each sleeve and associated collar.

4. A roll and axle assembly adapted for paper making machinery comprising a hollow roll, sleeves tightly embraced by the roll and spaced inwardly from the roll ends, a through axle extending through and beyond the roll ends, collars non-rotatably mounted on the axle and spaced to register with said sleeves, and a layer of rubber disposed between each sleeve and cooperating collar.

5. A roll and axle assembly adapted for paper making machinery comprising a hollow roll, an axle extending through and beyond the roll ends for rotation with the roll, disc shaped bearing means supporting the roll on the axle internally of the roll and flexible longitudinally of the axle, and means on the roll for securing the bearing means to the roll by gripping only the peripheral portion thereof.

6. A roll and axle assembly adapted for paper making machinery comprising a hollow roll, an axle extending through and beyond the roll ends for rotation with the roll, cooperating resilient annular bearing means on the roll and axle positioned within the roll, sleeves for retaining said bearing means in position engaging said roll secured outside of said roll against longitudinal displacement, and cooperating collars on said axle engaging said bearing means for causing the roll and axle to rotate in unison.

7. A roll and axle assembly adapted for paper making machinery comprising a hollow roll, an axle extending through and beyond the roll ends for rotation with the roll, detachable resilient axially flexible bearing means on the roll and axle positioned within the roll, and annular means adjustably secured on the roll and on the axle for retaining said bearing means against longitudinal displacement.

8. A roll and axle assembly adapted for paper making machinery comprising a hollow roll shell, an axle extending freely through and beyond the roll ends, spaced thrust-supporting bearings therebetween comprising contiguous shell-mounted and axle-mounted faces that are relatively shiftable longitudinally, a solid, resilient, axially-flexible annulus of thrust-supporting substance between said faces distortable to permit the relative longitudinal shifting without galling metal-to-metal contact at said faces, and means mounted on said shell and said axle for maintaining said substance between said faces.

9. A roll and axle assembly adapted for paper making machinery comprising a hollow roll shell, an axle extending freely through and beyond the roll ends, spaced thrust supporting bearings therebetween and disposed internally of said roll and comprising contiguous shell-mounted and axle-mounted faces that are relatively shiftable longitudinally, a solid resilient axially-flexible annulus of thrust-supporting substance between said faces distortable to permit the relative longitudinal shifting without galling metal-to-metal contact of said faces, means mounted on said axle for maintaining said substance in position against said axle-mounted face, and sleeves embraced by said shell and contacting said substance for maintaining said substance on said shell-mounted face.

10. A roll and axle assembly adapted for paper making machinery comprising a hollow roll shell, an axle extending freely through and beyond the roll ends, spaced thrust-supporting bearings therebetween and disposed internally of said roll and comprising contiguous shell-mounted and axle-mounted faces that are relatively shiftable longitudinally, a solid resilient axially-flexible annulus of thrust-supporting substance between said faces distortable to permit the relative longitudinal shifting without galling metal-to-metal contact of said faces, sleeves embraced by said shell clampingly engaging said annulus for corotation thereof with said shell, and collars non-rotatably mounted on the axle and spaced to register with said sleeves for clampingly engaging said annulus for corotation thereof with said axle.

11. A roll and axle assembly adapted for paper making machinery comprising a hollow roll shell, an axle extending freely through and beyond the roll ends, spaced thrust-supporting bearings therebetween and disposed internally of said roll and comprising contiguous shell-mounted and axle-mounted faces that are relatively shiftable longitudinally, a solid resilient axially-flexible annulus of thrust-supporting substance between said faces distortable to permit relative longitudinal shifting therebetween, and sleeves embraced by said shell and collars non-rotatably mounted on said axle cooperating with said annulus to corotatably support said shell on said axle.

12. A roll and axle assembly adapted for paper making machinery comprising a hollow roll shell having a pair of shoulders in said shell spaced inwardly from opposite ends thereof, an axle extending freely through and beyond the roll ends having shoulders thereon in registery with the shoulders inside the shell, spaced thrust-supporting bearings therebetween comprising contiguous shell-mounted and axle-mounted faces each adjacent to respective shoulders on said shell of said axle, a solid resilient axially flexible annulus of thrust-supporting substance between said faces distortable to permit relative longitudinal shifting between said faces, sleeves embraced by said shell clampingly engaging the outer periphery of said annulus against said shell shoulders, and collars non-rotatably mounted on said axle and clampingly engaging the inner periphery of said annulus against the axle shoulders.

LLOYD HORNBOSTEL.

References Cited in the file of this patent

UNITED STATES PATENTS

| Number | Name | Date |
|---|---|---|
| 41,851 | Merritt | Mar. 8, 1864 |
| 886,998 | Love | May 5, 1908 |
| 1,145,558 | Coppage | July 6, 1915 |
| 1,222,501 | White | Apr. 10, 1917 |
| 1,644,819 | Doerr | Oct. 11, 1927 |
| 2,025,746 | Horton | Dec. 31, 1935 |
| 2,261,740 | Makarius | Nov. 4, 1941 |
| 2,395,915 | Specht | Mar. 5, 1946 |

FOREIGN PATENTS

| Number | Country | Date |
|---|---|---|
| 388 | Great Britain | of 1881 |
| 670 | Great Britain | of 1889 |
| 13,641 | Great Britain | of 1900 |
| 14,222 | Great Britain | of 1907 |
| 227,295 | Germany | Oct. 18, 1910 |